(12) United States Patent
Agrawal et al.

(10) Patent No.: US 12,182,972 B2
(45) Date of Patent: Dec. 31, 2024

(54) ELECTRONIC DEVICE WITH DUAL CAMERA BASED AUTOMATIC WHITE BALANCE IMAGE ADJUSTMENT

(71) Applicant: MOTOROLA MOBILITY LLC, Wilmington, DE (US)

(72) Inventors: Amit Kumar Agrawal, Bangalore (IN); Rahul Bharat Desai, Hoffman Estates, IL (US); Chekit R Mehta, Buffalo Grove, IL (US)

(73) Assignee: Motorola Mobility LLC, Chicago, IL (US)

( * ) Notice: Subject to any disclaimer, the term of this patent is extended or adjusted under 35 U.S.C. 154(b) by 370 days.

(21) Appl. No.: 17/681,456

(22) Filed: Feb. 25, 2022

(65) Prior Publication Data
US 2023/0274396 A1    Aug. 31, 2023

(51) Int. Cl.
*G06T 5/70* (2024.01)
*G06T 5/50* (2006.01)

(52) U.S. Cl.
CPC ............... *G06T 5/70* (2024.01); *G06T 5/50* (2013.01); *G06T 2207/10024* (2013.01)

(58) Field of Classification Search
CPC ............ G06T 2207/10024; G06T 5/50; G06T 5/70; G06T 5/90; H04N 23/88; H04N 23/90
See application file for complete search history.

(56) References Cited

U.S. PATENT DOCUMENTS

2018/0027181 A1 * 1/2018 Roulet ................. G06T 5/70
                                                    348/38
2020/0098150 A1 * 3/2020 Sobolev ............ G06T 19/006

FOREIGN PATENT DOCUMENTS

WO    WO-2014172671 A1 * 10/2014    .......... A61B 5/0077
WO    WO-2015162605 A2 * 10/2015    ......... G06K 9/00228

* cited by examiner

*Primary Examiner* — Ruiping Li
(74) *Attorney, Agent, or Firm* — Isidore PLLC

(57) ABSTRACT

An electronic device incorporates, and method and computer program product provide improved auto white balance (AWB) performance. The electronic device receives first image content from a first image capturing device of an electronic device. The electronic device receives second image content from a second image capturing device. The second image capturing device has a second field of view (FOV) that differs from a first FOV of the first image capturing device. The controller identifying, during an image capturing process for a target image within the first FOV, whether a condition exists that causes a distortion in a white balance of the first image content. In response to identifying that the condition exists, the controller captures the second image content within the second FOV, determining an AWB value for the second image content, and automatically adjusting the first image content using the AWB value for the second image content.

17 Claims, 6 Drawing Sheets

ELECTRONIC DEVICE WITH DUAL CAMERA BASED AUTOMATIC WHITE BALANCE IMAGE ADJUSTMENT

BACKGROUND

1. Technical Field

The present disclosure relates generally to electronic devices having front and back cameras, and more particularly to electronic devices that automatically adjust captured images based on ambient light characteristics.

2. Description of the Related Art

Digital camera systems are composed of a set of algorithms that are commonly referred to as the 3As: auto-focus, auto-exposure, and auto-white balance (AWB). Setting all three algorithms at the appropriate values for a particular scene is essential in providing a good quality photo. The human eyes are very adept at automatically setting these values correctly, but for computerized system, this can often be a challenge. AWB algorithms attempt to set the correct lighting temperature to the scene at hand. Depending on the particular scene, the AWB algorithm may be challenged to determine the neutral color when the image is dominated by a predominant color, such as viewing a homogenous color of a wall or a macro image of a single flower. Conventional AWB algorithms respond by incorrectly reducing the predominant color.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
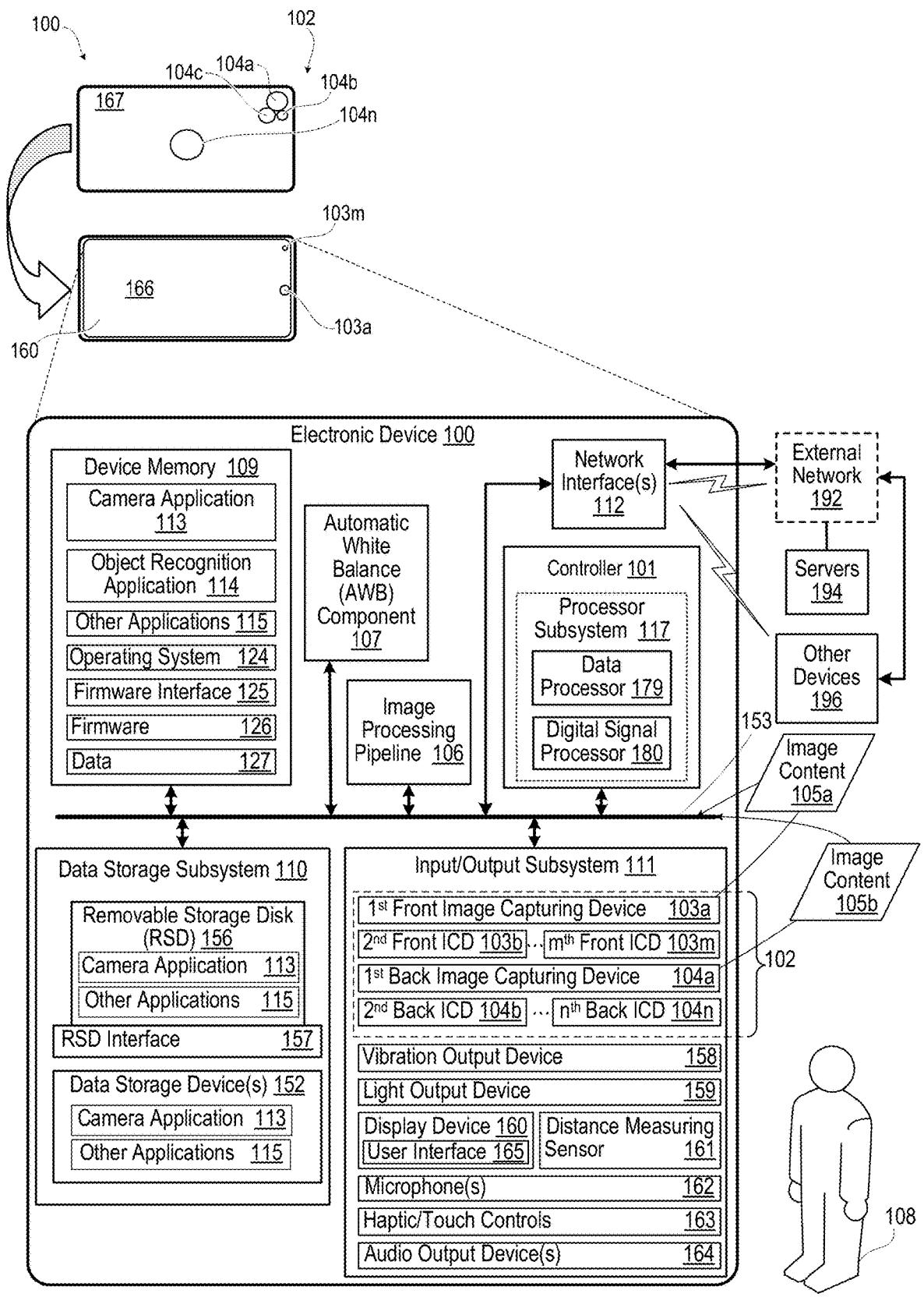
FIG. 1 depicts a functional block diagram of an electronic device having at least two image capturing devices with different fields of view used to improve an auto white balance (AWB) setting of captured images, according to one or more embodiments.

According to a first aspect of the present disclosure, an electronic device incorporates a method and a computer program product that enable increase accuracy of automatic white balance (AWB) performance. The electronic device has multiple image capturing devices including: (i) a first image capturing device having a first field of view (FOV) and that produces first image content; and (ii) a second image capturing device having a second FOV that differs from the first FOV and that produces second image content. A controller of the electronic device is communicatively coupled to the first image capturing device and the second image capturing device. The controller identifies, during an image capturing process for a target image within the first FOV, whether a condition exists that causes a distortion in a white balance of the first image content. In response to identifying that the condition exists, the controller captures the second image content within the second FOV, determines an AWB value for the second image content, and automatically adjusts the first image content using the AWB value for the second image content.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of electronic device 100 in an operating environment within which the features of the present disclosure are advantageously implemented. In particular, controller 101 of electronic device 100 is communicatively coupled to two or more image capturing devices 102, such as first through $m^{th}$ front image capturing devices 103a-103m and first through $n^{th}$ back image capturing devices 104a-104n. Electronic device 100 includes at least two image capturing devices 102 having different fields of view. Image capturing devices are abbreviated as ICD in FIGS. 1-2. In an example, electronic device 100 includes front image capturing devices 103a and second front image capturing device 103b. In another example, electronic device 100 includes first front image capturing device 103a and first back image capturing device 104a. In an additional example, electronic device 100 includes first back image capturing device 103a and second back image capturing device 104b. Controller 101 receives image content 105a-105b, such as images and video streams, from image capturing devices 102. Each one of image content 105a-105b differs from the others due to respective ones of image capturing devices 102 having different orientations, magnifications and other camera settings, and fields of view, etc. As an example, in the illustrated embodiments, front image capturing device 103a is an optical camera and front image capturing device 103m is an infrared or low light camera. Back image capturing device 104a is a telephoto camera. Back image capturing device 104b is a wide angle camera or panoramic camera. Back image capturing device 104c is a macro camera. Back image capturing device 104n is a high-speed camera.

The ambient light around electronic device 100 varies in intensity and color, requiring adjustment in optical settings for image processing pipeline 106 that performs image processing of image content 105a-105b. In an example, image processing pipeline 106 performs adjustments for brightness, hue, size, aspect ratio, AWB, etc. Image processing pipeline 106 includes, or is augmented by, AWB component 107 that determines AWB values of particular image content 105a-105b. AWB component 107 incorporates one or more AWB algorithms to analyze image content for AWB parameters or values. Controller 101 uses AWB values to adjust AWB for particular image content 105a-105b from corresponding image capturing device 102. AWB component 107 may be implemented in software, hardware or a combination thereof to obtain AWB values of image content 105a-105b, the AWB values utilized to adjust AWB for image content 105a-105b from corresponding image capturing devices 102. According to aspects of the present disclosure, controller 101 determines when one of image capturing devices 102, such as back image capturing device 104a, designated as "camera in service" has a field of view substantially filled with a predominant color band or color temperature. Provided with such image content, AWB component 107 would be deprived of a neutral color to obtain accurate AWB values. Without a source of a neutral color, the resulting AWB adjustment would be inaccurate with the predominant color band or color temperature being subdued. As another aspect of the disclosure, controller 101 can also determine when a distance to the image being captured is less than a preset threshold enabling use of AWB values from another image capturing device 102 on an opposite side of electronic device 100. In response, controller 101 improves AWB performance of AWB component 107 by using AWB values obtained from another image capturing device 102, such as front image capturing device 103a, to adjust AWB for back image capturing device 104a designated as "camera in service". Person 108 may select the camera in service from among the multiple image capturing devices 102, and controller 101 then identifies one or more second image capturing devices 102 to use for capturing the ambient light AWB value.

Electronic device 100 can be one of a host of different types of devices, including but not limited to, a mobile cellular phone, satellite phone, or smart-phone, a laptop, a net-book, an ultra-book, a networked smart watch, networked sports/exercise watch, and/or a tablet computing device or similar device. As more completed presented within communication device 200 of FIG. 2, described hereafter, electronic device 100 can also be a device supporting wireless communication. In these implementations, electronic device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Most importantly, it is appreciated that the features described herein can be implemented with a display device of various other types of electronic devices that are not necessarily a communication device. The specific presentation or description herein of a mobile communication device in addition to a data processing system as different examples of electronic device 100 are for example only, and not intended to be limiting on the disclosure.

Referring now to the specific component makeup and the associated functionality of the presented components. In one or more embodiments, electronic device 100 includes device memory 109, data storage subsystem 110, input/output (I/O) subsystem 111, and network interface 112, each of which is managed by controller 101. Device memory 109 includes program code for applications, such as camera application 113, object recognition application 114, and other application(s) 115. AWB component 107 may be program code in device memory 109. Alternatively, AWB component 107 may be a dedicated digital signal processing module or feature of image processing pipeline 106. Image processing pipeline 106 performs additional image processing algorithms or adjustments to images captured by one or more of image capturing devices 102. Device memory 109 further includes operating system (OS) 124, firmware interface 125, such as basic input/output system (BIOS) or Uniform Extensible Firmware Interface (UEFI), and firmware 126. Device memory 109 stores data 127 that is used by AWB component 107, camera application 113, object recognition application 114, and other application(s) 115.

Controller 101 includes processor subsystem 117, which executes program code to provide operating functionality of electronic device 100. The software and/or firmware modules have varying functionality when their corresponding program code is executed by processor subsystem 117 or secondary processing devices within electronic device 100. Processor subsystem 117 of controller 101 can execute program code of AWB component 107, camera application 113, object recognition application 114, and other application(s) 115 to configure electronic device 100 to perform specific functions. Device memory 109 can include data 127 that is used by AWB component 107, camera application 113, object recognition application 114, and other application(s) 115. In an example, data 127 include AWB values that are obtained from image content 105a-105b and AWB threshold(s) that define a condition that distorts AWB. In an example, controller 101 determines whether a condition exists that causes a distortion in a white balance of first image content 105a of a target image captured within a first FOV of a particular camera in service, such as rear image capturing device 104a. In response to identifying that the condition exists, the controller 101 captures second image content 105b within a second FOV of another one of image capturing devices 102, such as front image capturing device 103a. Controller 101 determines an AWB value for second image content 105b within second FOV. Controller 101 automatically adjusts first image content 105a using the AWB value for second image content 105b. In one or more embodiments, controller 101 stores first image content 105a in device memory 109. In one or more embodiments, controller 101 communicates first image content 105a network interface 112 to another electronic device that is connected to network interface 112.

Data storage subsystem 110 of electronic device 100 includes data storage device(s) 152. Controller 101 is communicatively connected, via system interlink 153, to data storage device(s) 152. Data storage subsystem 110 provides applications, program code, and stored data on nonvolatile storage that is accessible by controller 101. For example, data storage subsystem 110 can provide a selection of applications and computer data, such as AWB component 107 and other application(s) 115. These applications can be loaded into device memory 109 for execution by controller 101. In one or more embodiments, data storage device(s) 152 can include hard disk drives (HDDs), optical disk drives, and/or solid-state drives (SSDs), etc. Data storage subsystem 110 of electronic device 100 can include removable storage device(s) (RSD(s)) 156, which is received in RSD interface 157. Controller 101 is communicatively connected to RSD 156, via system interlink 153 and RSD interface 157. In one or more embodiments, RSD 156 is a non-transitory computer program product or computer readable storage device. Controller 101 can access RSD 156 or data storage device(s) 152 to provision electronic device 100 with program code, such as code for AWB component 107 and other application(s) 115.

I/O subsystem 110 includes image capturing devices 102 such as front image capturing devices 103a-103m and back image capturing devices 104a-104n. I/O subsystem 110 also includes vibration output device 158, light output device 159, display device 160, distance measuring sensor 161, microphone 162, touch/haptic controls 163, and audio output device(s) 164. Display device 160 is communicatively coupled to controller 101 and presents user interface 165 on front display screen 166 and/or operates as a user interface device. Front image capturing devices 103a-103m are on a front side of electronic device 100 along with display device 160. Back image capturing devices 104a-104n are at back/rear side 167 of electronic device 100.

Controller 101 manages, and in some instances directly controls, the various functions and/or operations of electronic device 100. These functions and/or operations include, but are not limited to including, application data processing, communication with second communication devices, navigation tasks, image processing, and signal processing. In one or more alternate embodiments, electronic device 100 may use hardware component equivalents for application data processing and signal processing. For example, electronic device 100 may use special purpose hardware, dedicated processors, general purpose computers, microprocessor-based computers, micro-controllers, optical computers, analog computers, dedicated processors and/or dedicated hard-wired logic.

Controller 101 includes processor subsystem 117, which includes one or more central processing units (CPUs), depicted as data processor 179. Processor subsystem 117 can include one or more digital signal processors 180 that are integrated with data processor 179. Processor subsystem 117 can include other processors that are communicatively coupled internally or externally to data processor 179. Data processor 179 is communicatively coupled, via system interlink 153, to device memory 109, data storage subsystem 110, and network interface 112. Network interface 112 enables electronic device 100 to connect (via wireless or wired connection) to external network 192 and directly/indirectly to other devices 196. Network 192 provides connection to and can include one or more network servers 194 and can provide connection to other devices 196. Electronic device 100 is thus able to connect with servers 194 and other devices 196 to share and/or download application data that can be utilized to implement features of the disclosure. System interlink 153 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 153) are illustrated in FIG. 1, it is to be understood that more, fewer, or different interconnections may be present in other embodiments.

Figure 2:
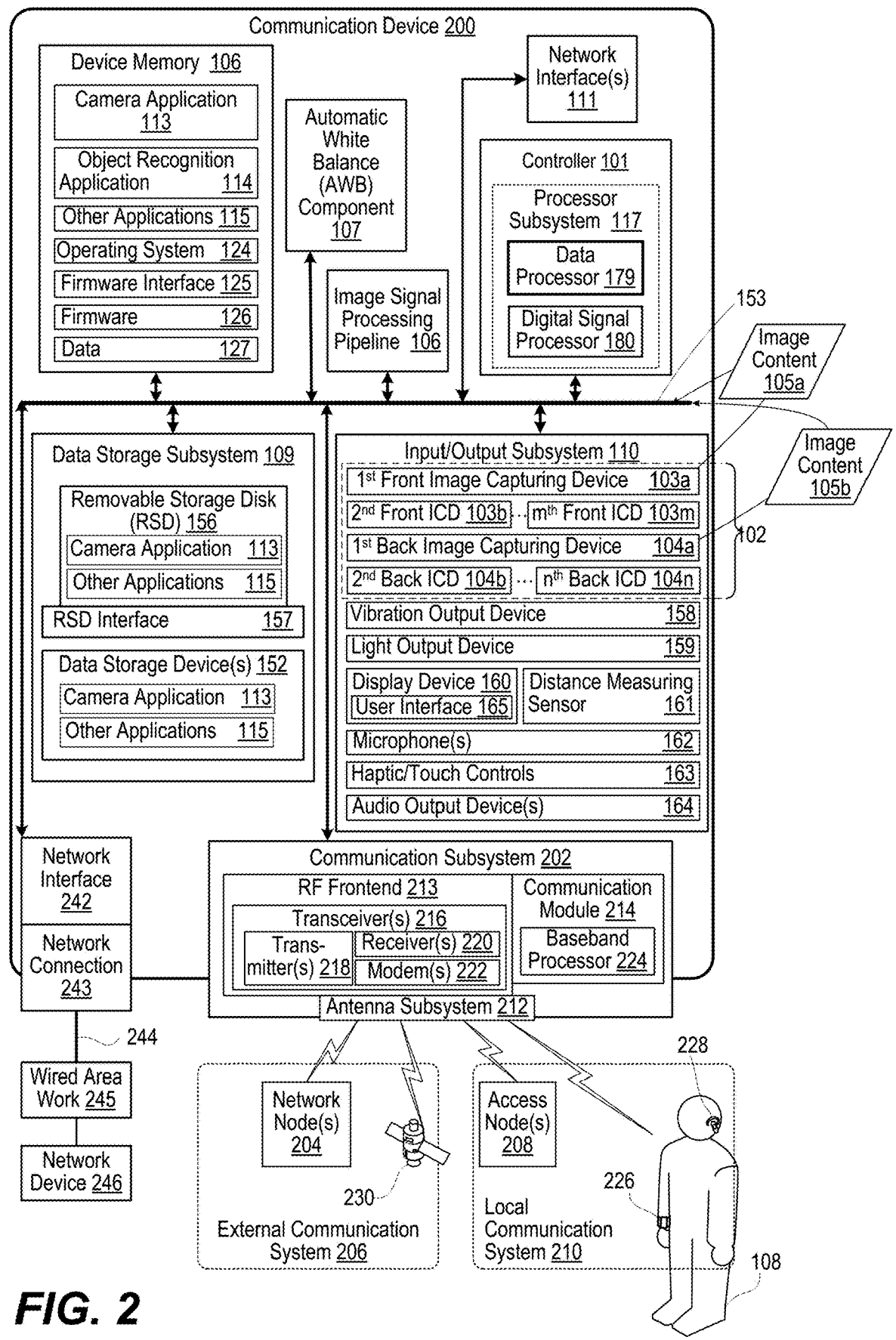
FIG. 2 depicts a functional block diagram of a communication device with front and back image capturing devices and in an operating environment within which the features of the present disclosure are advantageously implemented, according to one or more embodiments.

FIG. 2 is a functional block diagram of communication device 200 in an operating environment within which the features of the present disclosure are advantageously implemented. Communication device 200 is an implementation of electronic device 100 (FIG. 1) that further includes communication subsystem 202 for communicating, using a cellular connection, with network node(s) 204 of external communication system 206 and for communicating, using a wireless connection, with access node(s) 208 of local communication system 210. Communication subsystem 202 includes antenna subsystem 212. Communication subsystem 202 includes radio frequency (RF) front end 213 and communication module 214. RF front end 213 includes transceiver(s) 216, which includes transmitter(s) 218 and receiver(s) 220. RF front end 213 further includes modem(s) 222. Communication module 214 of communication subsystem 202 includes baseband processor 224 that communicates with controller 101 and RF front end 213. Baseband processor 224 operates in a baseband frequency range to encode data for transmission and decode received data, according to a communication protocol. Modem(s) 222 modulate baseband encoded data from communication module 214 onto a carrier signal to provide a transmit signal that is amplified by transmitter(s) 218. Modem(s) 222 demodulates each signal received from external communication subsystem 202 using by antenna subsystem 212. The received signal is amplified and filtered by receiver(s) 220, which demodulate received encoded data from a received carrier signal.

In one or more embodiments, controller 101, via communication subsystem 202, performs multiple types of cellular OTA or wireless communication with local communication system 210. Communication subsystem 202 can communicate via Bluetooth connection with one or more personal access network (PAN) devices, such as smart watch 226 and wireless headset 228. Communication via Bluetooth connection includes both transmission and reception via a Bluetooth transceiver device. In one or more embodiments, communication subsystem 202 communicates with one or more locally networked devices via a wireless local area network (WLAN) link provided by access node(s) 208. In one or more embodiments, access node(s) 208 supports communication using one or more IEEE 802.11 WLAN protocols. Access node(s) 208 is connected to a wide area network such as the Internet. In one or more embodiments, communication subsystem 202 communicates with GPS satellites 230 to obtain geospatial location information.

In one or more embodiments, communication device 200 includes network interface controller (NIC or "network interface") 242 with a network connection (NC) 243. NIC 242 can be synonymous with and perform similar functions as network interface 112 (FIG. 1) in some implementations. Network cable 244 connects NIC 242 to wired area network 245. NC 243 can be an Ethernet connection. NIC 242 can support one or more network communication protocols. Wired area network 245 can be a local area network (LAN), a campus area network (CAN), a metropolitan area network (MAN), or a wide area network (WAN). Network device 246 is communicatively coupled to wired area network 245.

Figure 3A:
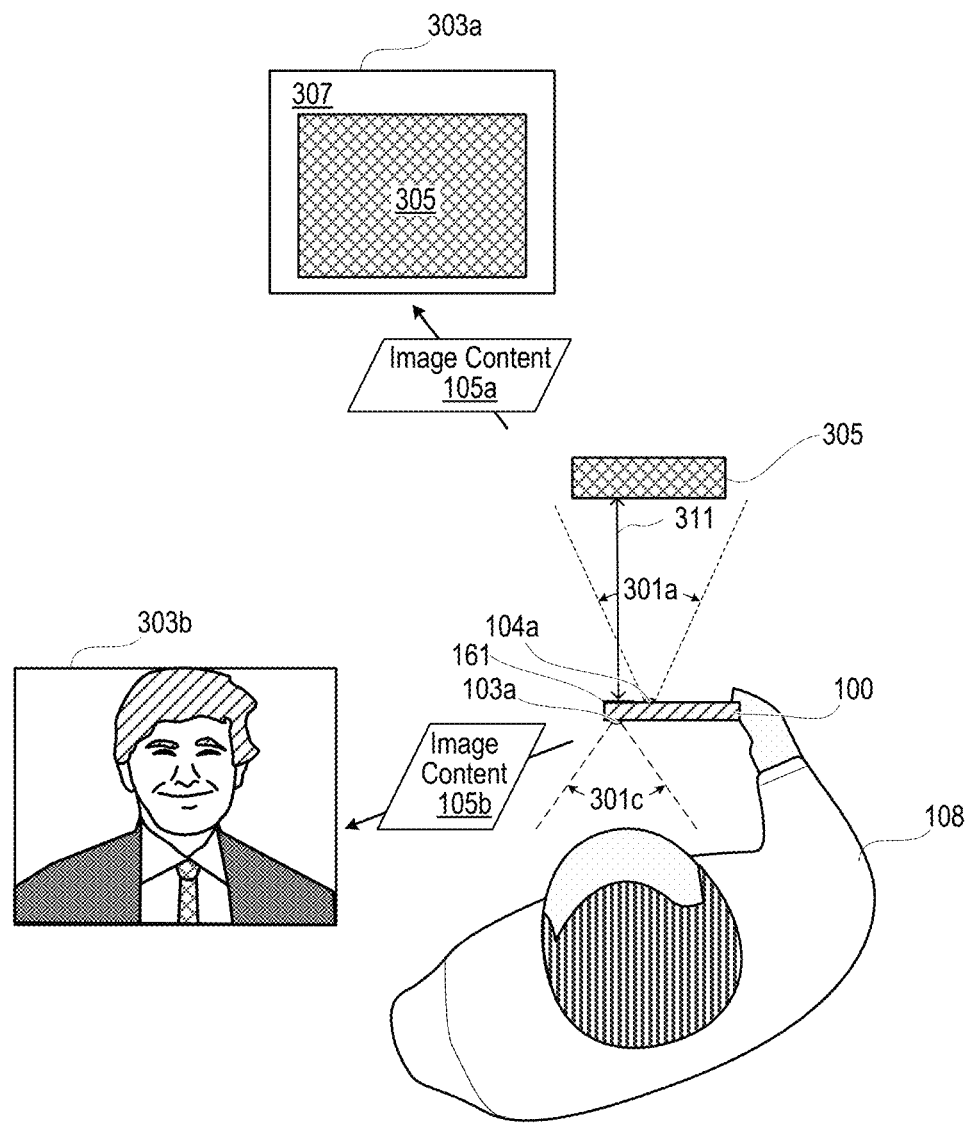
FIG. 3A depicts a top view of the electronic device of FIG. 1 or communication device of FIG. 2 having front and back image capturing devices with different fields used to improve the AWB setting of captured images of an object, according to one or more embodiments.

FIG. 3A depicts a top view of the one of electronic device 100 and communication device 200 capturing image content 105a and 105b received respectively from front image capturing device 103a and rear image capturing device 104a respectively from front FOV 301a and back FOV 301b. In one or more embodiments, rear image capturing device 104a is designated as the camera in service. Target image 303a, which includes object 305, is captured by rear image capturing device 104a to produce image content 105a that primarily encompasses object 305. That is, object 305 is the predominant object in image content 105a. Background 307 that surrounds object 305 is only a small proportion of image content 105a. Colors of object 305 are within a narrow color range or color band or of a particular color temperature, which presents a condition that causes a distortion in automatic white balance of target image 303a. According to one embodiment, controller 101 (FIG. 1) determines that detected front image 303b provided within front image content 105b has a color value that does not present the condition. Front image capturing device 103a is able to capture white balance lighting characteristics around electronic device 100. In an example, image content 105a received in FOV 301b from front image capturing device 103a encompasses person 108 and provides a range of colors and color temperatures that enable accurate measurement of AWB values. In one or more embodiments, distance 311 of object 305 from rear image capturing device 104a is within a threshold distance 311 that indicates that AWB parameters and values from image content 105a from front image capturing device 103a may be used. Controller 101 (FIG. 1) obtains AWB values from at image content 105b-105c to use in adjusting AWB of image content 105a.

Figure 3B:
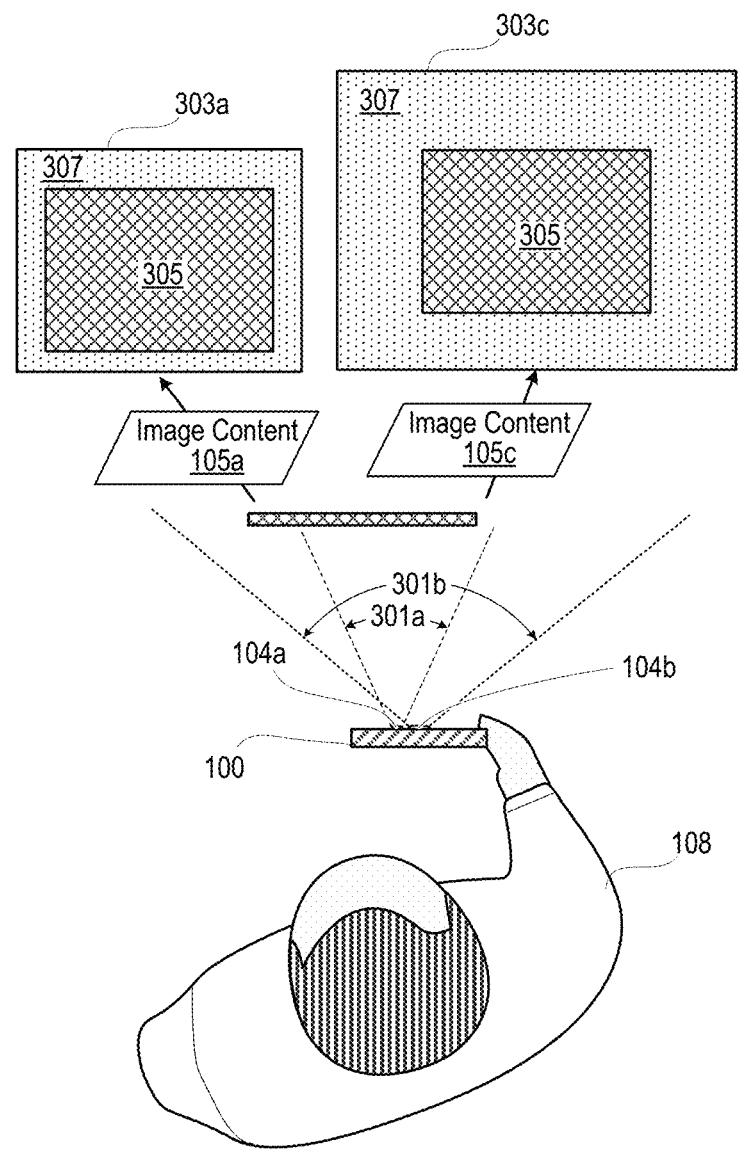
FIG. 3B depicts a top view of the electronic device of FIG. 1 or communication device of FIG. 2 having at least two image capturing devices with different fields of view on the same side used to improve the AWB setting of captured images, according to one or more embodiments.

FIG. 3B depicts a top view of electronic device 100 of FIG. 1 or communication device 200 of FIG. 2 having at least two back image capturing devices 104a-104b with different fields of view 301a and 301c respectively on the same side that are used to improve the AWB adjustment of captured image content 105a of object 305. Rear image capturing device 104a is designated as the camera in service and has a higher magnification than rear image capturing device 104b. Thus, FOV 301a of rear image capturing device 104a is narrower than FOV 301b of rear image capturing device 104b. Controller 101 (FIG. 1) determines that rear image 303c provided within image content 105c does not have a predominant color temperature or a narrow color band and thus does not create the condition. Controller 101 (FIG. 1) obtains the AWB value from image content 105c to use in adjusting AWB of image content 105a.

Figure 4A:
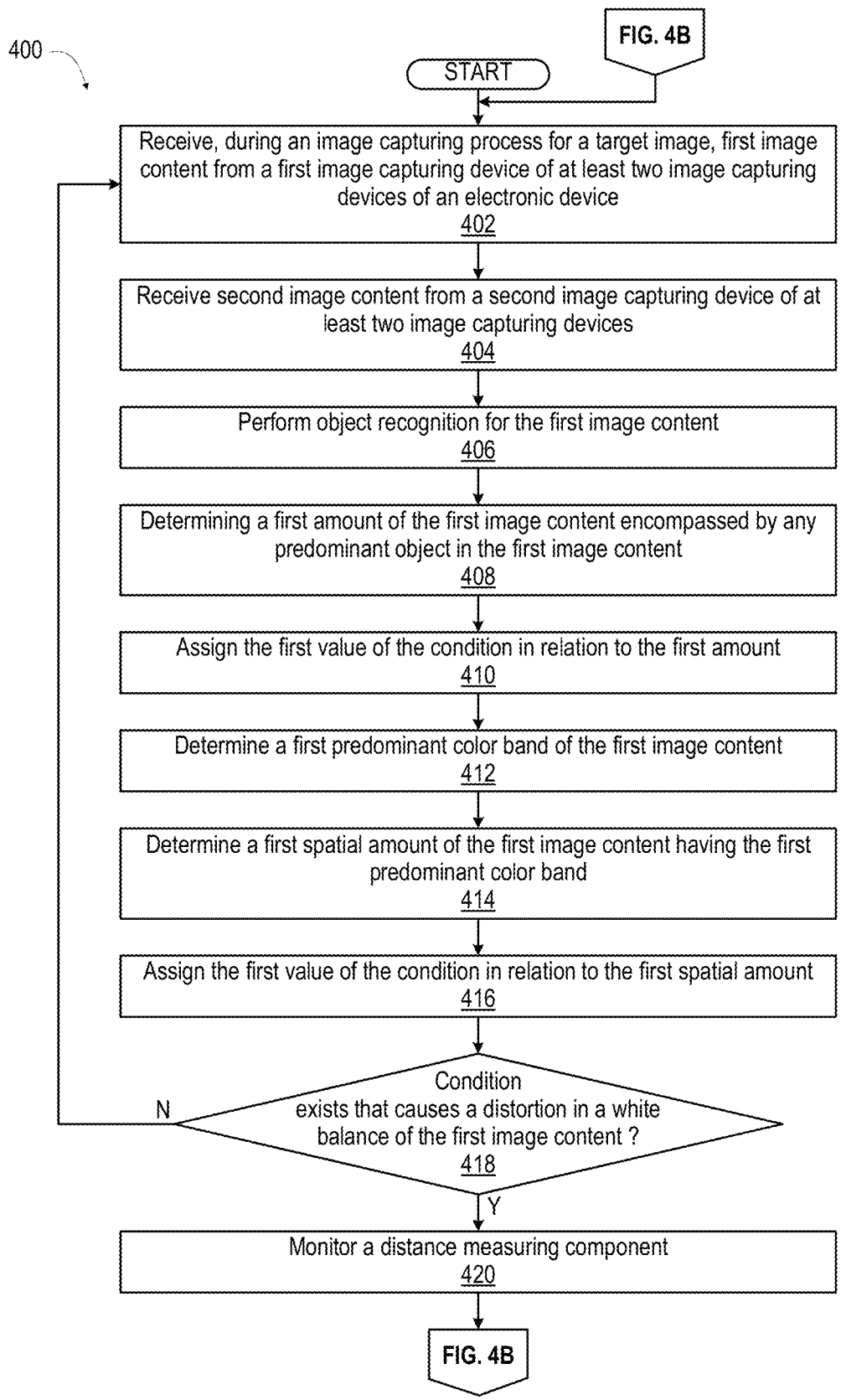
FIGS. 4A-4B (collectively "FIG. 4") presents a flow diagram of a method by which an electronic/communication device improves AWB performance of one image capturing device by referencing AWB characteristics detected by a second image capturing device, according to one or more embodiments.
Figure 4B:
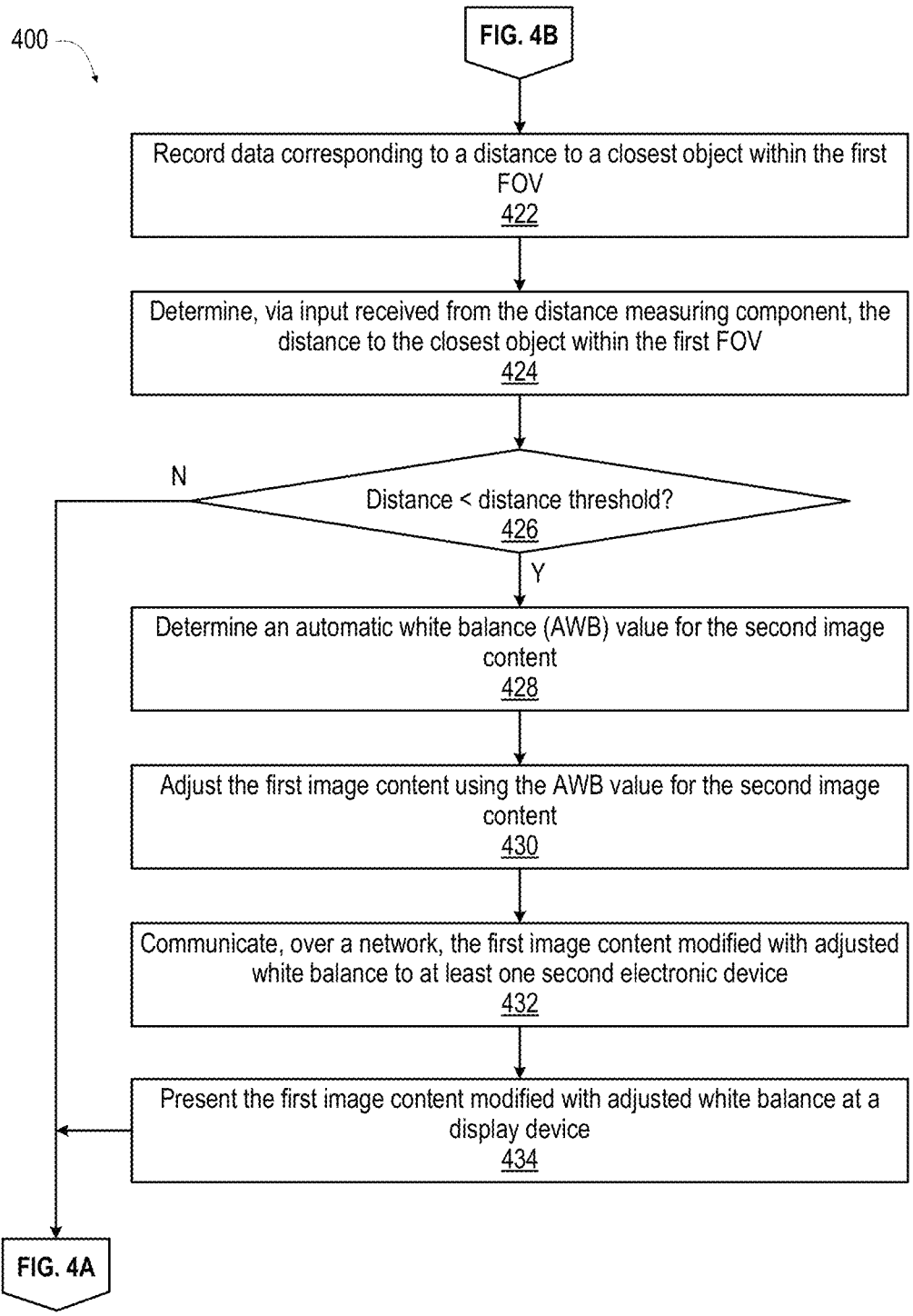

FIGS. 4A-4B (collectively "FIG. 4") present a flow diagram of method 400 performed by electronic device 100 (FIG. 1) or communication device 200 (FIG. 2) for improving AWB performance of one image capturing device by referencing a second image capturing device. The descriptions of method 400 is provided with general reference to the specific components illustrated within the preceding FIGS. 1, 2, and 3A-3B, and specific components referenced in method 400 may be identical or similar to components of the same name used in describing preceding FIGS. 1, 2, and 3A-3B. In one or more embodiments, controller 101 (FIGS. 1-2) configures electronic device 100 (FIG. 1) or communication device (FIG. 2) to provide functionality of method 400. With reference to FIG. 4A, method 400 includes receiving, during an image capturing process for a target image, first image content from a first image capturing device of at least two image capturing devices of an electronic device (block 402). The first image capturing device has a first field of view (FOV) that encompasses the target image.

In one or more embodiments, method 400 includes determining whether the first image content is dominated by one object, such as by zooming in or using a macro lens for photographing a flower. In particular, method 400 includes performing object recognition for the first image content (block 406). Method 400 including determining a first amount of the first image content encompassed by any predominant object in the first image content (block 408). Method 400 includes assigning a first value of an AWB adjustment triggering condition in relation to the first amount (block 410). In one or more embodiments, method 400 includes determining whether the first image content encompasses a large area having the same or similar or identical color temperature, such as with a snowscape or a wall. In particular, method 400 includes determining a first predominant color band of the first image content (block 412). Method 400 includes determining a first spatial amount of the first image content having the first predominant color band (block 414). Method 400 includes assigning the first value of the AWB adjustment triggering condition in relation to the first spatial amount (block 416). Method 400 includes identifying, for the first image content, whether a condition exists that causes a distortion in a white balance of the first image content. In one embodiment, the identifying of the condition is based on the first value being above a threshold that is indicative of a proportion of an image having a predominant color temperature sufficient to cause the distortion (decision block 418). In response to the condition not existing, method 400 returns to block 402.

Method 400 includes activating a second image capturing device of the at least two image capturing devices and receiving second image content from the second image capturing device (block 404). The second image capturing device has a second FOV that differs from the first FOV. In one embodiment, the first image capturing device is on a first side of the electronic device and the second image capturing device is on an opposite second side of the electronic device. In another embodiment, the second FOV is wider than the first FOV of the first image capturing device enabling capturing of ambient light around the target image within the second FOV.

In response to identifying that the condition exists, method 400 further includes monitoring a distance measuring component to determine a distance to the target image (block 420). In an example, an image capturing device detects three dimensional image data. In another example, two image capturing devices are used for stereoscopic measurement of distance. In an additional example, a separate distance measurement sensor detects range, such as using an infrared, an ultrasonic, or a lidar sensor. Method 400 includes recording data corresponding to a distance to a closest object within the first FOV (block 422). Method 400 includes determining, via input received from the distance measuring component, the distance to the closest object within the first FOV (block 424). Method 400 includes determining whether the distance is less than the distance threshold (decision block 426). In response to the distance not being less than the distance threshold (i.e., greater than or equal to), method 400 returns to block 402 (FIG. 4A). In response to the distance being less than the distance threshold, method 400 includes determining an automatic white balance (AWB) value for the second image content (block 428). Method 400 includes adjusting the first image content using the AWB value for the second image content (block 430). In one or more embodiments, method 400 includes communicating, over a network, the first image content modified with adjusted white balance to at least one second electronic device (block 432). In one or more embodiments, method 400 includes presenting the first image content modified with adjusted white balance at a display device (block 434). Then method 400 returns to block 402.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
  at least two image capturing devices including: (i) a first image capturing device having a first field of view (FOV) and that produces first image content; and (ii) a second image capturing device having a second FOV that differs from the first FOV and that produces second image content;
  a controller communicatively coupled to the first image capturing device and the second image capturing device, and which:
    identifies, during an image capturing process for a target image within the first FOV, whether a condition exists that causes a distortion in a white balance of the first image content, wherein to identify whether the condition exists the controller determines, for the first image content, a first value related to a proportion of an image having a predominant color temperature sufficient to cause the distortion;

in response to identifying that the condition exists:
captures the second image content within the second FOV;
determines an automatic white balance (AWB) value for the second image content; and
automatically adjusts the first image content using the AWB value for the second image content.

2. The electronic device of claim 1, the electronic device further comprising:
a distance measuring component communicatively coupled to the controller and which records data corresponding to a distance to a closest object within the first FOV;
wherein the controller determines, via input received from the distance measuring component, the distance to the closest object within the first FOV; and
adjusts the first image content using the AWB value for the second image content further in response to determining that the distance is less than a distance threshold.

3. The electronic device of claim 1, wherein the first image capturing device is on a first side of the electronic device and the second image capturing device is on an opposite second side of the electronic device, the second image capturing device being able to capture, within the second FOV, white balance lighting characteristics around the electronic device.

4. The electronic device of claim 1, wherein the second FOV of the second image capturing device is wider than the first FOV of the first image capturing device.

5. The electronic device of claim 1, further comprising at least one network interface that communicatively connects the electronic device over a network to at least one second electronic device, wherein the controller is communicatively connected to the at least one network interface to communicate the first image content modified with adjusted white balance to the at least one second electronic device.

6. The electronic device of claim 1, further comprising a display device that is communicated to the controller, and which presents the first image content modified with adjusted white balance at the display device.

7. The electronic device of claim 1, wherein, to determine the first value of the condition for the first image content and the second image content, the controller:
performs object recognition for the first image content;
determines a first amount of the first image content encompassed by any predominant object in the first image content;
assigns the first value of the condition in relation to the first amount.

8. The electronic device of claim 1, wherein, to determine the first value of the condition for the first image content, the controller:
determines a first predominant color band of the first image content;
determines a first spatial amount of the first image content having the first predominant color band; and
assigns the first value of the condition in relation to the first spatial amount.

9. A method comprising:
receiving first image content from a first image capturing device of at least two image capturing devices of an electronic device, the first image capturing device having a first field of view (FOV);
receiving second image content from a second image capturing device of at least two image capturing devices, the second image capturing device having a second FOV that differs from the first FOV;
identifying, during an image capturing process for a target image within the first FOV, whether a condition exists that causes a distortion in a white balance of the first image content, wherein identifying whether the condition exists comprises determining, for the first image content, a first value related to a proportion of an image having a predominant color temperature sufficient to cause the distortion;
in response to identifying that the condition exists:
capturing the second image content within the second FOV;
determining an automatic white balance (AWB) value for the second image content; and
automatically adjusting the first image content using the AWB value for the second image content.

10. The method of claim 9, further comprising:
monitoring a distance measuring component;
recording data corresponding to a distance to a closest object within the first FOV;
determining, via input received from the distance measuring component, the distance to the closest object within the first FOV; and
adjusting the first image content using the AWB value for the second image content further in response to determining that the distance is less than a distance threshold.

11. The method of claim 9, further comprising capturing, within the second FOV, white balance lighting characteristics around the electronic device, wherein the first image capturing device is on a first side of the electronic device and the second image capturing device is on an opposite second side of the electronic device.

12. The method of claim 9, further comprising receiving the second image content from the second image capturing having the second FOV that is wider than the first FOV of the first image capturing device.

13. The method of claim 9, further comprising communicating, over a network, the first image content modified with adjusted white balance to at least one second electronic device.

14. The method of claim 9, further comprising presenting the first image content modified with adjusted white balance at a display device.

15. The method of claim 9, wherein determining the first value of the condition for the first image content comprises:
performing object recognition for the first image content;
determining a first amount of the first image content encompassed by any predominant object in the first image content;
assigning the first value of the condition in relation to the first amount.

16. The method of claim 9, wherein determining the first value of the condition for the first image content comprises:
determining a first predominant color band of the first image content;
determining a first spatial amount of the first image content having the first predominant color band; and assigning the first value of the condition in relation to the first spatial amount.

17. A computer program product comprising:

a non-transitory computer readable storage device; and program code on the computer readable storage device that when executed by a processor associated with an electronic device, the program code enables the electronic device to provide functionality of:

receiving first image content from a first image capturing device of at least two image capturing devices of an electronic device, the first image capturing device having a first field of view (FOV);

receiving second image content from a second image capturing device of at least two image capturing devices, the second image capturing device having a second FOV that differs from the first FOV;

identifying, during an image capturing process for a target image within the first FOV, whether a condition exists that causes a distortion in a white balance of the first image content, wherein identifying whether the condition exists comprises determining, for the first image content, a first value related to a proportion of an image having a predominant color temperature sufficient to cause the distortion;

in response to identifying that the condition exists:
 capturing the second image content within the second FOV;
 determining an automatic white balance (AWB) value for the second image content; and
 automatically adjusting the first image content using the AWB value for the second image content.

* * * * *